United States Patent [19]

Liptak et al.

[11] 4,159,562

[45] Jul. 3, 1979

[54] METHOD FOR SECURING WINDING COMPONENTS IN THE SLOT OF A ROTARY ELECTRIC MACHINE

[75] Inventors: Gabor Liptak, Baden; Roland Schuler, Wettingen, both of Switzerland

[73] Assignee: BBC Brown Boveri & Company Limited, Baden, Switzerland

[21] Appl. No.: 841,474

[22] Filed: Oct. 12, 1977

[30] Foreign Application Priority Data

Nov. 17, 1976 [CH] Switzerland .................. 14458/76

[51] Int. Cl.² ........................................... H02K 15/06
[52] U.S. Cl. ....................................... 29/596; 310/43; 310/214
[58] Field of Search .............. 29/596, 598; 310/214, 310/215, 43

[56] References Cited

U.S. PATENT DOCUMENTS

| | | | |
|---|---|---|---|
| 3,391,294 | 7/1968 | Moxie et al. ................ | 310/214 |
| 3,952,406 | 4/1976 | Madsen ...................... | 29/598 |

*Primary Examiner*—Carl E. Hall
*Attorney, Agent, or Firm*—Burns, Doane, Swecker & Mathis

[57] ABSTRACT

A method of securing one or more insulated winding components in the slots of a rotary electrical machine against any displacement during operation in which one or more inserts which have a deformable and heat-hardenable characteristic such as is established by a fibrous material impregnated with a heat-hardenable resin in the B-state, are inserted in the slot in contact with the adjoining side of a winding component. The winding components and non-hardened inserts are then subjected to pressure to effect a deformation matching any tolerance irregularity in the profile of the adjacent surface of the winding component, this step being followed by a gradual heating of the inserts while still under pressure so as to harden the same, and the entrance to the slot is then closed in the usual manner by insertion of a wedge.

21 Claims, 4 Drawing Figures

METHOD FOR SECURING WINDING COMPONENTS IN THE SLOT OF A ROTARY ELECTRIC MACHINE

FIELD OF THE INVENTION

The present invention relates to an improved method for securing winding components such as bar type conductors in the slots of a rotary electrical machine by means of a wedge and hardenable, deformable, compensating inserts which can be fitted between adjacent winding components in the slot and/or between the bottom of the slot and the adjacent winding component and/or between the winding component and the wedge which closes off the entrance to the slot, or the wedge base placed beneath the wedge. The invention also relates to an improved construction for an insert to be used in conjunction with the improved method.

THE PRIOR ART

Winding components of rotary electrical machines now being manufactured are composed almost exclusively of coils or bars, and two insulated coil sides are usually placed within the same slot, one above the other to substantially fill the same. The entrance ends of the slots are closed off after the conductors have been put in place, usually by means of wedges having a trapezoidal profile made from insulative materials which have the function of mechanically retaining the conductors tightly in place against any possible displacement.

It is very important for reliable operation of the machine that the mechanical retention to be secure throughout a long period of operation and that it be guaranteed under any operating condition of the machine. A great number of solutions are already known for solving the problem of improving the retention of the winding components.

Swiss Pat. No. 564,872 discloses a slot closing arrangement wherein a series of disk springs are arranged one after another in a row along the slot under the slot wedge and these springs apply pressure against the winding components in the slot. Published German application DT-OS No. 21 65 727 uses a sinusoidal, i.e. a wave, type of plate spring arrangement for the same purpose. However, the malleability of these components limits the period of secure retention. Swiss Pat. No. 433,494 discloses a different arrangement wherein a wave type of plate spring can be placed under an additional compression by means of rotary plugs which are accessible from the outside of the slot. This solution is, however, very complicated from a structural point of view and is also costly. Published German application DT-OS No. 15 38 975 discloses a method for securing the winding components such as conductor bars within the slots wherein hardenable elastic slot inserts are used, these being hardened by raising their temperature, after being inserted in the slot and the slot closed by a wedge. This expedient has the disadvantage that it is impossible to maintain a sufficient compression on the conductors. Published German application DT-OS 23 42 168 also make use of elastic slot inserts which can be hardened. These are coated on at least one side with a foamed material and contain substances which have an activating or accelerating effect on the hardening reaction by the impregnating resin system used for the insulation. After closing off the slot thereby to enclose the winding, the conductor bar insulation is impregnated, and the hardening process then follows which also serves to harden the slot inserts. This method is limited to, and usable only for fully impregnated windings.

SUMMARY OF THE INVENTION

The principal objective of the present invention is to provide an improved method using inserts for securing the winding components within their slots and which overcomes the disadvantages inherent in the prior known arrangements such as those discussed above. The improved method and improved insert structure not only assures a good fit at the interfaces between the insert and winding components but also a sufficiently powerful and lasting compression which is necessary to sharply attenuate vibration amplitudes and movement of the winding within the slots even in instances of extreme mechanical stresses arising, for example, as the result of multiphase short-circuit conditions within the windings.

The present invention solves these problems by the use of deformable and hardenable inserts placed in the slot in any manner known per se such as between adjacent winding components, or between the base of the slot and the innermost winding component, or between the outermost winding component and the wedge, or wedge base if one is used, the inserts then being subjected to pressure so that the faces thereof become deformed to match any tolerance irregularity in the profile of the adjacent surface, and the inserts thereafter being hardened by increasing their temperature, followed by insertion of the retaining wedge to close off the slot.

A primary advantage of the invention is that it becomes possible to maintain at all times, a high compression of more than 200 N/cm$^2$ which is sufficient to counteract all winding component disturbing forces which may arise within the slot.

It is expedient to harden the inserts at a temperature gradient of from 1 to 5° K/h, and preferably 2° K/h. This slow increase in temperature is particularly advantageous for objects possessing a very high thermal capacity and will assure proper deformation of the inserts without use of a rapid heating.

It is advantageous to harden the inserts at pressures ranging from 200 to 400 N/cm$^2$. The advantage of such a method is that the deformable inserts or inlays are converted to a practically uncompressible state when, for all practical purposes, a maximum deformation state has been reached.

For a practical application of the improved method in accordance with the invention, the insert comprises most advantageously a strip of hard material covered on one, or both, sides with a layer of deformable material capable of being hardened. It will be advantageous to select the thickness of the strip of hard material in such manner that it comes close to the desired overall spacing factor in the slot. Placement of deformable layers on both sides of the hard material is advantageous if the insert is located between surfaces each of which is characterized by tolerance irregularities requiring equalization. Obviously, in this latter case it is also possible to utilize two inserts, each having a hardenable, deformable layer only on one side of the strip of hard material, the opposite sides of the latter being in contact with each other and serving as planing surfaces.

It is advantageous if the strip of hard material consists of a fiber-reinforced single or multi-layered material impregnated with a synthetic resin and hardened. Examples are, a glass fabric impregnated with polyester or epoxide resins, or a resin-impregnated glass mat, glass fleece or polyester fleece, or combinations of the same. The deformable layer, capable of being hardened and placed on one, or both sides of the hard material strip can consist of a single or multi-layered material impregnated with a synthetic resin in the "B" state, for example a glass fabric, glass fleece, or polyester fleece impregnated with a polyester or epoxide resin in the "B" state. These materials insure a proper compression strength after being hardened.

In a further development of the invention, the height of the deformable layer is made greater than one-half the depth of tolerance irregularities present within the areas of contact between the deformable layer and the slot and/or the winding components and which are to be equalized out by deformation of the deformable layer, and smaller than two fold the depth of such irregularities. Such a ratio range serves the purpose of keeping the thickness of the deformable portion of the insert to a minimum.

In the case of one embodiment of the invention, wherein the deformable layer is applied to only one side of the strip of hard material, the opposite side thereof is polished and/or provided with a lubricant, for example a film of a silicone or fluoride wax in an organic solvent. This structural arrangement allows the winding components filling the slot to undergo thermal expansions if necessary.

It is also advantageous to coat the insert with a varnish which is elastic and has a poor electrical conductivity characteristic for example, a varnish filled with graphite or lamp black with a silicone or polyurethane base. This measure prevents the insert from sticking to the surrounding material and will properly draw off displacement currents.

BRIEF DESCRIPTION OF DRAWINGS

The foregoing as well as other objects and advantages inherent in the invention will become more apparent from the following description of preferred embodiments in conjunction with the appertaining drawings wherein.

DETAILED DESCRIPTION OF PREFERRED EMBODIMENTS

Figure 1:
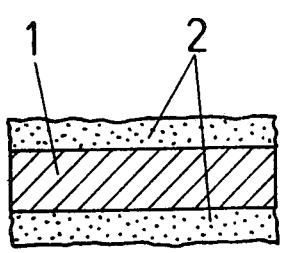
FIG. 1 is a partial cross-section of one embodiment of the insert provided with a hardenable deformable layer on each side of a strip of hard material.

With reference to FIG. 1 it will be seen that the one or more inserts to be placed in the longitudinally extending slots provided in the body of the rotary electrical machine for receiving the electrical windings is constituted by an elongated composite strip whose length is equal to that of the winding slot, the strip being composed of a solid material such as a multi-layered glass fabric which has been impregnated with an epoxide resin and hardened. The thickness of the solid material 1 is determined by the particular spacing factor involved in locating the winding(s) in the slot. The solid strip material 1 is covered on both sides with deformable layers 2 which consist of glass fibers impregnated with an epoxide resin in the so-called "B-state," i.e. the resin is in a partially hardened state. The deformable layers 2 are relatively thin, having a thickness of about 0.5 to 1 mm., which is sufficient for compensating out tolerance height differences. The insert illustrated in FIG. 1 is coated with an elastic silicone or polyurethane varnish which is filled with graphite or lamp black.

Figure 2:
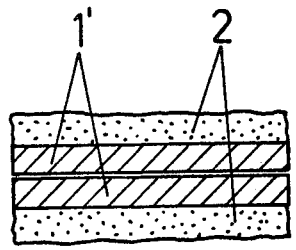
FIG. 2 is also a partial cross-section of another embodiment of the invention which utilizes a pair of inserts, each having a hardenable deformable layer only on one side of a strip of hard material, the opposite sides of the latter being in contact with each other and serving as planing surfaces.

FIG. 2 shows an arrangement of two inserts wherein the corresponding strips of solid material 1' are arranged in side-to-side relation and the opposite side of each strip is covered with a deformable layer 2. The material strips 1' consist of a glass fabric impregnated with a heat-resistant epoxide resin and which is fully hardened. The non-covered sides of the strips 1' are provided with a lubricant, known per se. The deformable layers 2 consist of a glass fleece which is impregnated with an epoxide resin in the B-state, the thickness of which is between 0.5 and 1.0 mm.

Figure 3:
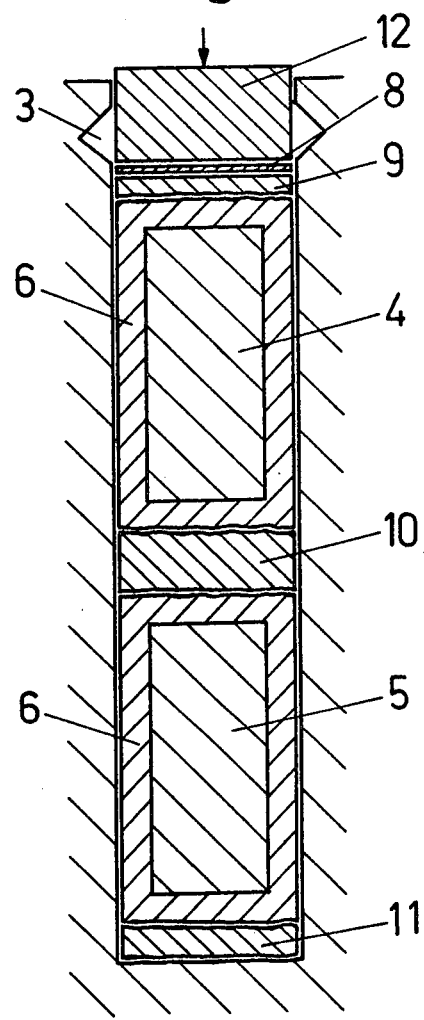
FIG. 3 is a partial cross-section of the slot area of an electrical machine showing a typical assembly of insulated conductor bars and inserts in a slot during an intermediate step in the method in which pressure is applied to the aggregate in order to even out any surface irregularities by deformation of the deformable layer(s) of the insert(s)

The method in accordance with the invention for securing bar-type electrical windings in the slots of an electrical machine is accomplished, for example, in the following manner: a composite insert 11 (consisting of a strip of solid material 1 covered on one or both sides with a deformable layer 2) is placed in the bottom of the slot 3, as shown in FIG. 3. A bottom bar-type winding conductor 5 provided with insulation 6 is then inserted to lie against the bottom insert 11. A composite insert 10 similar to insert 11 is then placed in contact with the insulation 6 at the upper side of the lower conductor 5, the insulated upper conductor bar 4 is then placed in the slot in contact with insert 10, a composite insert 9 similar to inserts 10 and 11 is then placed in contact with the insulation 6 at the upper side of conductor 4, and finally a wedge base 8 in the form of a metallic strip and having a length equal to that of the slot is inserted in the slot on top of the insert 9.

The inserts 9, 10 and 11 are illustrated in outline form only in FIG. 3, and can be of the specific constructions shown in FIGS. 1 or 2, or a combination of each.

The wedge base 8 is then subjected to pressure in a radial direction, i.e. in the case of FIG. 3, from the top toward the bottom of the slot, to a pressure of, for example 300 N/cm$^2$ means of an auxiliary apparatus, indicated only schematically by the press member 12, while at the same time, conductors 4 and 5 are gradually heated up by current-generated heat to approximately 120° C. with a temperature gradient of approximately 2° k./h.

Figure 4:
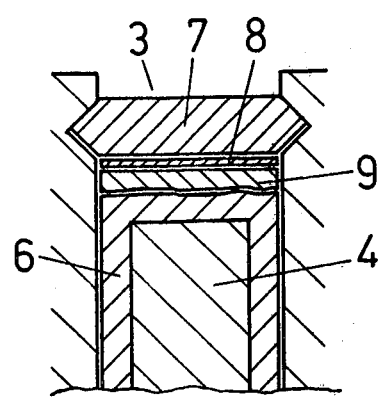
FIG. 4 is a view similar to FIG. 3 but following the hardening of the deformable layers after their deformation and after the slot-closing wedge has been inserted.

The layers 2 of glass fleece impregnated with an epoxide resin in the B-state and which at ambient temperature are difficult to deform, do become capable of deformation as the temperature is raised and can then be compressed gradually to accord with the conditions of the contact surfaces. In this manner, there is accomplished first a proper alignment, free of play, of all components present within the slot 3, and secondly, since the deformable layers 2 of the inserts will harden only after a complete deformation, this situation will remain stable after a temperature influence period lasting for several hours and will remain so. Upon completion of these steps of the overall procedure, a wedge 7 (FIG. 4) is fixed in place in the slot by sliding it longitudinally along the complementarily configured grooved profile just beneath the open end of the slot. With the aid of wedge 7, it is possible to generate compressions of up to 300 N/cm² for holding the conductors 4, 5 firmly in place without causing any further significant deformations of the inserts 9, 10 and 11. A high compression is thus assured for a long period of time. The same composition of material for the deformable layers 2 is always feasible irrespective of the required thickness of the inserts 9, 10 and 11. Obviously, the objective of the invention is attainable by the use of insert arrangements other than those specifically illustrated in the drawings. For example, it is possible to superpose the inserts with single-side and/or dual-side deformable layers 2 in any combination desired. It is also possible, for example, to use the inserts only between wedge 7 and the upper conductor 4, or between the conductors 4 and 5.

We claim:

1. The method of securing insulated winding components in the slots of a rotary electrical machine against displacement which includes the steps of substantially filling the slot with the insulated winding components, there being included in the slot at least one deformable and heat-hardenable insert in contact with an adjoining side of one of the winding components, subjecting the winding components and non-hardened insert to pressure applied at the entrance of the slot thereby to effect a deformation thereof to match any tolerance irregularity in the profile of the adjacent surface of the winding component, heating the insert while under pressure to harden the same, and closing off the entrance to the slot by means of a wedge after completion of the insert hardening operation.

2. The method as defined in claim 1 for securing insulated winding components in the slots of a rotary electrical machine wherein the step of heating the insert under pressure is carried out at a temperature gradient of from 1 to 5° K/h and preferably 2° K/h.

3. The method as defined in claim 1 for securing insulated winding components in the slots of a rotary electrical machine wherein the step of subjecting the non-hardened insert to pressure is carried out at a pressure of from 200 to 400 N/cm².

4. The method as defined in claim 1 for securing insulated winding components in the slots of a rotary electrical machine wherein said deformable and heat-hardenable insert includes a strip of hard material and a layer of deformable and heat hardenable material applied to at least one side thereof.

5. The method as defined in claim 4 for securing insulated winding components in the slots of a rotary electrical machine wherein said layer of deformable and heat hardenable material is comprised of a fibrous substance impregnated with a heat-hardenable resin in the B-state.

6. The method as defined in claim 5 wherein the fibrous substance in said layer of deformable and hardenable material is constituted by a glass fabric.

7. The method as defined in claim 5 wherein the fibrous substance in said layer of deformable and hardenable material is constituted by a glass fleece.

8. The method as defined in claim 5 wherein the fibrous substance in said layer of deformable and hardenable material is constituted by a polyester fleece.

9. The method as defined in claim 5 wherein the impregnating heat-hardenable resin included in said material is of the polyester type.

10. The method as defined in claim 5 wherein the impregnating heat-hardenable resin included in said material is of the epoxide type.

11. The method as defined in claim 4 wherein said strip of hard material comprises a fiber-reinforced material such as a glass impregnated with a synthetic resin and hardened.

12. The method as defined in claim 4 wherein the height of said deformable and heat hardenable material is greater than one half the depth of any irregularities which may exist in the surface of the adjacent winding component, and smaller than two-fold such depth.

13. The method as defined in claim 4 wherein said layer of deformable and heat hardenable material is applied to only one side of said strip of hard material, the opposite side of said strip being planar.

14. The method as defined in claim 13 wherein the planar surface of said strip of hard material is coated with a lubricant.

15. The method as defined in claim 14 wherein the lubricant on the planar surface of said strip of hard material is a silicone.

16. The method as defined in claim 14 wherein the lubricant on the planar surface of said strip of hard material is a fluoride wax in an organic solvent.

17. The method as defined in claim 4 wherein said deformable and heat hardenable insert is coated with an elastic varnish comprising a base of silicone and a filling of graphite.

18. The method as defined in claim 4 wherein said strip of hard material comprises a fiber-reinforced material such as a polyester impregnated with a synthetic resin and hardened.

19. The method as defined in claim 4 wherein said deformable and heat hardenable insert is coated with an elastic varnish comprising a base of silicone and a filling of lamp black.

20. The method as defined in claim 4 wherein said deformable and heat hardenable insert is coated with an elastic varnish comprising a base of polyurethane and a filling of graphite.

21. The method as defined in claim 4 wherein said deformable and heat hardenable insert is coated with an elastic varnish comprising a base of polyurethane and a filling of lamp black.

* * * * *